(12) United States Patent
Liang et al.

(10) Patent No.: US 9,775,032 B2
(45) Date of Patent: Sep. 26, 2017

(54) METHOD FOR CONTROLLING ACCESS POINT IN WIRELESS LOCAL AREA NETWORK, AND COMMUNICATION SYSTEM

(71) Applicant: ZTE CORPORATION, Shenzhen, Guangdong Province (CN)

(72) Inventors: Qiandeng Liang, Shenzhen (CN); Liang Fan, Shenzhen (CN); Yong Chen, Shenzhen (CN)

(73) Assignee: ZTE CORPORATION (CN)

( * ) Notice: Subject to any disclaimer, the term of this patent is extended or adjusted under 35 U.S.C. 154(b) by 6 days.

(21) Appl. No.: 14/439,405

(22) PCT Filed: Aug. 27, 2013

(86) PCT No.: PCT/CN2013/082385
§ 371 (c)(1),
(2) Date: Apr. 29, 2015

(87) PCT Pub. No.: WO2014/101449
PCT Pub. Date: Jul. 3, 2014

(65) Prior Publication Data
US 2015/0304844 A1    Oct. 22, 2015

(30) Foreign Application Priority Data

Dec. 31, 2012 (CN) .......................... 2012 1 0592081

(51) Int. Cl.
*H04W 12/06* (2009.01)
*H04L 29/06* (2006.01)
(Continued)

(52) U.S. Cl.
CPC ............. *H04W 12/06* (2013.01); *H04L 63/08* (2013.01); *H04L 63/0892* (2013.01);
(Continued)

(58) Field of Classification Search
CPC ...... H04W 12/06; H04W 84/12; H04L 63/08; H04L 63/0892
(Continued)

(56) References Cited

U.S. PATENT DOCUMENTS

2004/0214576 A1* 10/2004 Myers ................. H04L 63/0272
455/445
2007/0206537 A1   9/2007 Cam-Winget et al.
(Continued)

FOREIGN PATENT DOCUMENTS

CN    101247295 A    8/2008
CN    101252498 A    8/2008
(Continued)

OTHER PUBLICATIONS

P. Calhoun et al. "Lightweight Access Point Protocol" Feb. 28, 2010. Retrieved from the Internet: URL:https://tools.ietf.org/html/rfc5412 on Jun. 26, 2015.
(Continued)

*Primary Examiner* — Matthew Henning
(74) *Attorney, Agent, or Firm* — Plumsea Law Group, LLC

(57) ABSTRACT

A method for controlling an access point in a wireless local area network (WLAN) and a communication system, the method includes: authenticating an access point; after the authentication succeeds, delivering an access controller list to the access point; the access point selecting an access controller from the access controller list according to a preset rule, and communicating with the selected access controller. Only in the case that the access point is successfully authenticated is the access controller list sent to the successfully-authenticated access point, thus solving the problem that the information of the access controller is leaked out because of delivering the access controller list to an illegitimately-set access point, and ensuring the security of network device information.

13 Claims, 2 Drawing Sheets

(51) Int. Cl.
    *H04W 84/12*      (2009.01)
    *H04W 88/08*      (2009.01)

(52) U.S. Cl.
    CPC ........... *H04L 63/101* (2013.01); *H04W 84/12* (2013.01); *H04W 88/08* (2013.01)

(58) Field of Classification Search
    USPC ............................................................ 726/3
    See application file for complete search history.

(56)         References Cited

U.S. PATENT DOCUMENTS

2008/0112363 A1*   5/2008   Rahman ................ H04W 8/005
                                                              370/331
2008/0181133 A1*   7/2008   Thubert ................ H04W 40/30
                                                              370/255
2011/0271345 A1    11/2011  Wolman et al.

FOREIGN PATENT DOCUMENTS

CN      101815365 A          8/2010
CN      101217440 B    *     3/2011
CN      102217284 A1         10/2011
EP        2469961 A1         6/2012
EP        2723145 A1         4/2014

OTHER PUBLICATIONS

European Search Report issued Sep. 18, 2015 in European Patent Application No. EP13868706.6.

* cited by examiner

METHOD FOR CONTROLLING ACCESS POINT IN WIRELESS LOCAL AREA NETWORK, AND COMMUNICATION SYSTEM

CROSS-REFERENCE TO RELATED APPLICATION(S)

This application is the U.S. National Phase application of PCT application number PCT/CN2013/082385 having a PCT filing date of Aug. 27, 2013, which claims priority of Chinese patent application 201210592081.X filed on Dec. 31, 2012, the disclosures of which are hereby incorporated by reference.

TECHNICAL FIELD

The present document relates to the field of communications, and more particularly, to a method for controlling an access point (AP) in a Wireless Local Area Network (WLAN) and a communication system.

BACKGROUND OF THE RELATED ART

With the popularity of a variety of intelligent terminals (such as smart phones, tablet PCs, and so on), the terminal user can access the Internet via the WLAN anytime and anywhere to work; the traditional WLAN comprises APs (access points), Access Controllers (ACs), and an Authentication Authorization Accounting (AAA) server, and the user terminal device can access the network through the APs and ACs after authenticated by the AAA server. With the integration of the WLAN and the fixed broadband network, various types of user terminals access the fixed broadband network via the WLAN and the wired link, the Broadband Network Gateway (BNG) uniformly performs user authentication and traffic control, while at this time the AC device is only responsible for the management and service configuration of the AP device; meanwhile, the network operators have increasing demands on the number of deployed APs and their speeds, accordingly, the AP device automatic deployment technology is followed.

The current AP device automatic deployment method is to obtain the AC list from the DHCP server in the network according to the Dynamic Host Configuration Protocol (DHCP) after the AP is powered, and then select one AC from the list to communicate so as to achieve the AP management, but in this technique, since the DHCP server always delivers the AC list to the AP device regardless of whether the AP is legitimate or not, when the accessing AP device happens to be an illegitimately-set AP device, there is a problem that information of the legitimate AC device is leaked out to the illegitimately-set AP device.

SUMMARY

In order to solve the problem in the related art that there is information of legitimate AC device leaked out because the server sends the AC list to the illegitimately-set AP device, the present document provides a method for controlling an AP in a WLAN and a communication system.

The present document provides a method for controlling an AP in a WLAN, in an embodiment, the method comprises: authenticating an AP; after the authentication succeeds, delivering an AC list to the AP; the AP selecting one AC from the AC list according to a preset rule and communicating with the selected AC.

Preferably, the process of authenticating the AP is: an authentication server authenticating the AP.

Preferably, the process of authenticating the AP comprises: judging whether access geographical location information of the AP, an account key of the AP and/or an authorization certificate of the AP is legitimate or not; if legitimate, further judging whether the AP meets policy requirements set by the authentication server or not; and if yes, the authentication of the AP succeeding.

Preferably, before delivering the AC list to the AP, the method for controlling an AP provided in the present document further comprises: updating the AC list.

Preferably, said updating the AC list is: a BNG and/or an authentication server updating an original AC list based on the original AC list and current loads of all ACs in the original AC list, and generating an AC list which will be delivered to the AP.

Preferably, the process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

Preferably, the process of communicating with the selected AC is: the AP communicating with the selected AC via Control And Provisioning of Wireless Access Points Protocol (CAPWAP).

Meanwhile, the present document further provides a communication system, and in an embodiment, the communication system comprises: at least one AP, at least one AC, a BNG and an authentication server; wherein the AP connects with the AC and the authentication server via the BNG; wherein, the authentication server is configured to: authenticate the AP, and deliver an AC list to the AP after the authentication succeeds; the AP is configured to: select one AC from the AC list according to a preset rule and communicate with the selected AC.

Preferably, the BNG is further configured to: save the AC list and deliver the saved AC list to the AP after the authentication server successfully authenticates the AP.

Preferably, the BNG and/or the authentication server is further configured to: update the AC list.

Preferably, the authentication server is an AAA server and/or a DHCP server.

Through the implementation of the present document, only in the case that the AP device is successfully authenticated, does the authentication server send the AC list to the successfully-authenticated AP device, thereby solving the problem of information leakage caused by delivering the AC list to an illegitimately-set AP device, and ensuring the security of network device information.

PREFERRED EMBODIMENTS OF THE INVENTION

Hereinafter, the present document will be further illustrated and explained through specific embodiments and in conjunction with the accompanying drawings.

The embodiment of the present document provides a technique of controlling APs in a WLAN to access the network, and solves the problem in the related art that an illegitimately-set AP device can access the network and the AC device information is leaked out due to delivering the AC list to the illegitimately-set AP device because no authentication is performed on the AP device.

Figure 1:
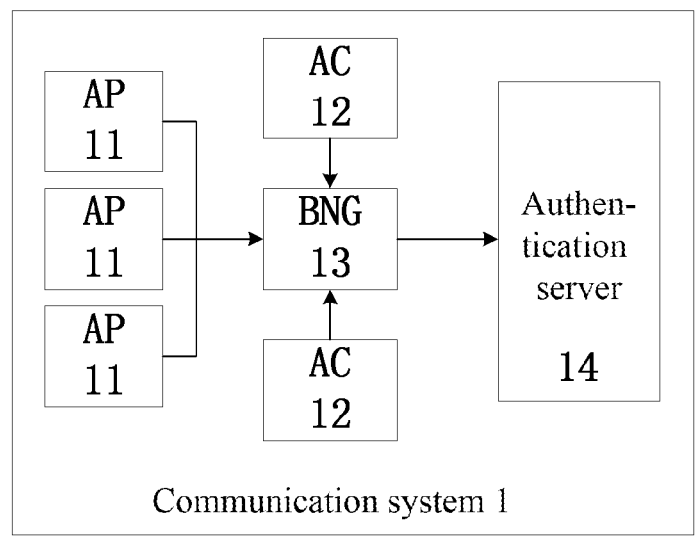
FIG. 1 is a schematic diagram of a communication system provided in an embodiment of the present document.

FIG. 1 is a schematic diagram of a communication system provided in an embodiment of the present document; as seen in FIG. 1, in this embodiment, the communication system 1 provided in the present document comprises at least one AP11, at least one AC12, a BNG13 and an authentication server 14, their connection relationship is shown in FIG. 1, the AP11 is connected with the AC12 and the authentication server 14 via the BNG13; wherein:

the AP11 is used to transit data signals between the user equipment and the network server;

the AC12 is used to manage and configure the AP11;

the BNG13 is used to transit data and traffic between the AP11 and AC12 as well as the authentication server 14;

the authentication server 14 is used to authenticate the AP11, and after the authentication succeeds, send the AC list to the AP11; specifically, the authentication server 14 can deliver the AC list to the successfully-authenticated AP11 via the BNG13;

the AP11 is used to select one AC12 from the received AC list according to the preset rule and communicate with the AC12; when the AC list only comprises the AC12 list in this communication network, the process of the AP11 selecting an AC12 from the received AC list according to the preset rule and communicating with the selected AC12 may be: the AP11 sequentially sending an access request to each AC according to the order of the ACs in the AC list, and selecting a successfully-accessed AC12 to establish a communication connection, and communicating with the selected AC12.

Preferably, in the abovementioned embodiment, the AP11 communicating with the selected AC12 may be specifically: the AP11 communicating with the selected AC12 through the CAPWAP, so that the AC12 manages and controls the AP11.

Preferably, in the abovementioned embodiment, the BNG13 is also used to save the AC list, and send its saved AC list to the successfully-authenticated AP after the authentication server successfully authenticates the AP. The BNG13 saving the AC list can be specifically: a network administrator configuring a default AC list on the BNG via a command line or an NMS (Network Management System).

Preferably, the BNG13 and/or the authentication server 14 in the abovementioned embodiment updates the AC list before delivering the AC list to the AP11, so as to deliver an AC list with the latest state; the updating mode may be specifically: the BNG13 and/or the authentication server 14 updating the original AC list according to the original AC list as well as the current load of each AC12 in the original AC list, and generating an AC list which will be delivered to the AP11.

Preferably, in the abovementioned embodiment, the authentication server 14 may be an AAA server and/or a DHCP server; when the authentication server 14 is an AAA server, the authentication server 14 itself can achieve the functions of authenticating the AP11 and delivering the AC list; but when the authentication server 14 is a DHCP server, it needs another server (such as an AAA server) which can implement the authentication function to authenticate the AP11, and send the authentication result to the DHCP server, when the authentication result is that the authentication succeeds, the DHCP server delivers the AC list to the successfully-authenticated AP11.

Figure 2:
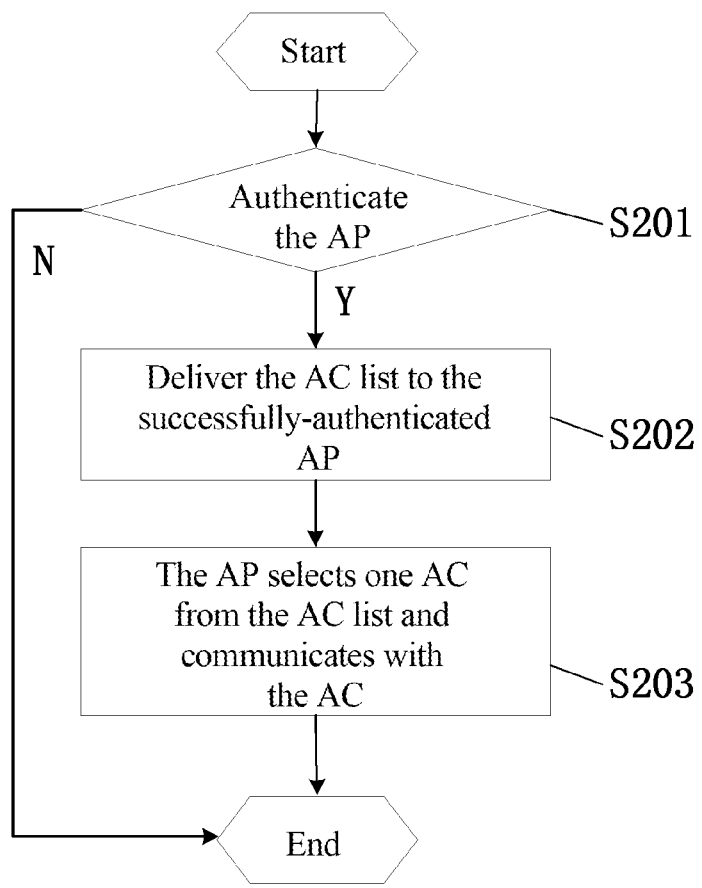
FIG. 2 is a schematic diagram of a method for controlling APs in a WLAN provided in an embodiment of the present document.

FIG. 2 is a schematic diagram of a method for controlling APs in a WLAN provided in an embodiment of the present document; From FIG. 2 it can be seen that in an embodiment, the method for controlling an AP provided in the present application comprises:

In step S201, it is to authenticate an AP; if the authentication succeeds, it is to proceed to step S202, otherwise, it is to end the process;

In step S202, after the authentication succeeds, it is to deliver the AC list to the successfully-authenticated AP;

In step S203, the AP selects one AC from the AC list according to the preset rule and communicates with the AC.

Preferably, after the authentication succeeds, the method for controlling an AP in the embodiment shown in FIG. 2 further comprises: sending an IP address to the successfully-authenticated AP.

Preferably, authenticating an AP in the embodiment shown in FIG. 2 is specifically: the authentication server authenticates the AP; furthermore, the authentication server comprises an AAA authentication server and/or a DHCP server.

Figure 3:
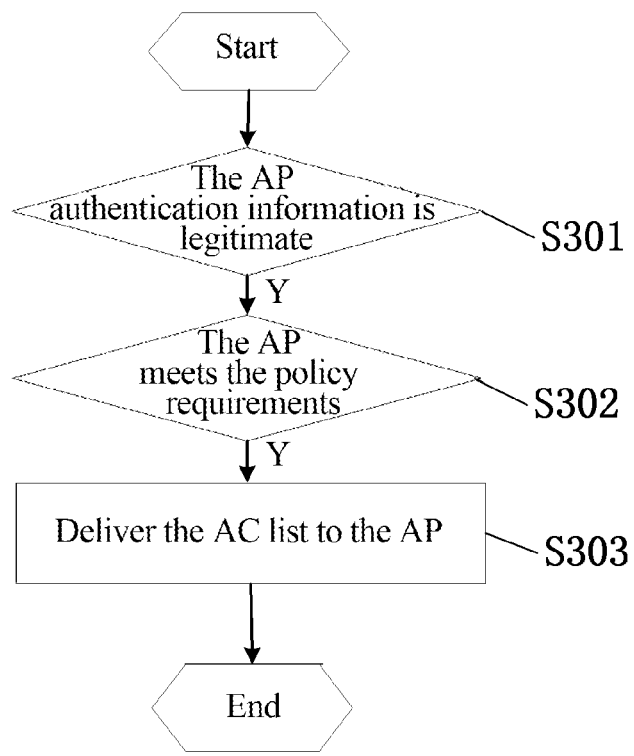
FIG. 3 is a schematic diagram of an AP authentication method provided in an embodiment of the present document.

FIG. 3 is a schematic diagram of the AP authentication method provided in an embodiment of the present document; as shown in FIG. 3, the process of authenticating an AP in the embodiment shown in FIG. 2 comprises the following steps:

In step S301, it is to judge whether the authentication information of the AP is legitimate or not; the authentication information of the AP comprises the access geographical location information of the AP, the account key of the AP and/or the authorization information such as the authorization certificate of the AP; if it is legitimate, it is to proceed to step S302; if it is not legitimate, the authentication fails, and the authentication process ends.

Specifically, it can be authenticated whether the authentication information of the AP belongs to one of the APs' deployed by the network operator or not, that is, it is to verify whether the authentication information of the AP belongs to the M authentication information list of all the APs provided by the network server or not, if yes, the AP is authenticated as legitimate, otherwise the AP is illegitimate.

In Step S302, it is to judge whether the AP meets the policy requirements set by the authentication server or not; if it meets, it is to proceed to step S303; if it does not meet, the authentication fails, and the authentication process ends.

In Step S303, the AP is successfully authenticated; it is to enter into the process of delivering the AC list (that is, step S202).

Preferably, delivering the AC list to the AP in the embodiment shown in FIG. 2 is specifically: the authentication server (a server having the authentication function, such as an AAA server and/or a DHCP server) and/or the BNG device delivers the AC list to the successfully-authenticated AP.

Preferably, the method for controlling an AP in the embodiment shown in FIG. 2 further comprises updating the AC list before delivering the AC list to the AP. The updating mode can be that the authentication server (a server such as an AAA server and a DHCP server) and/or the BNG device periodically obtains, or obtains in real time before delivering the AC list, the load of each AC in the delivering list, and arranges the ACs in the AC list according to the load of each AC, and the arrangement mode may be arranging all ACs in accordance with their loads from light to heavy; of course, the updating mode can also be that the authentication server (a server such as an AAA server and a DHCP server) and/or the BNG device periodically obtains, or obtains in real time before delivering the AC list, the location of each AC in the delivering list, and arranges the ACs in the AC list according to the location information of each AC, and the arrangement mode may be arranging all ACs in accordance with their distances to the AP from short to long.

Preferably, in the embodiment shown in FIG. 2, the process of the AP selecting one AC from the received AC list according to the preset rule and communicating with the AC can be specifically: the AP sequentially sending an access request to each AC according to the order of the ACs in the AC list, selecting a successfully-accessed AC to establish a communication connection, and communicating with the selected AC; of course, all of the accessible AC devices may also form a new AC list, and one AC is randomly selected from this new AC list to communicate.

Figure 4:
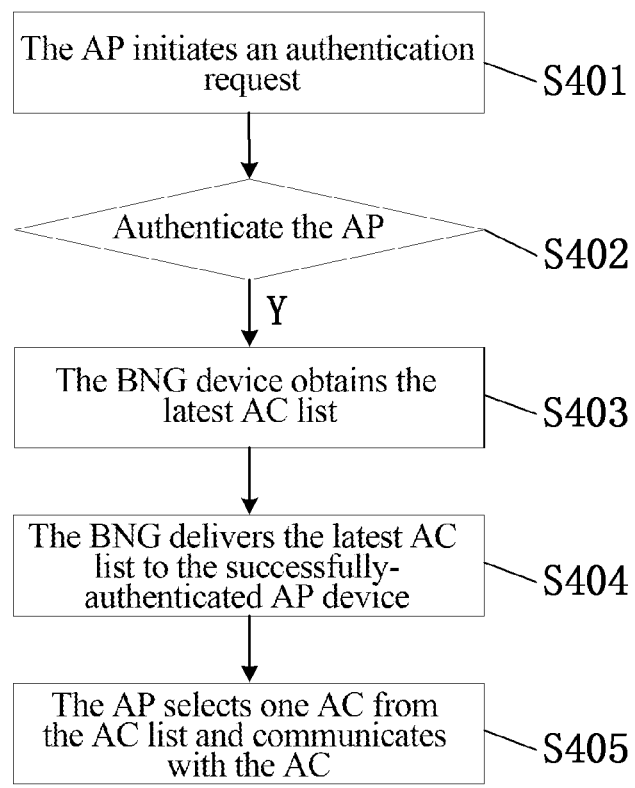
FIG. 4 is a schematic diagram of a method for controlling APs in a WLAN provided in a preferred embodiment of the present document.

FIG. 4 is a schematic diagram of a method for controlling APs in the WLAN provided in a preferred embodiment; from FIG. 4 it can be seen that, a preferred embodiment of the method for controlling the APs in a WLAN provided in present document comprises the following steps:

In step S401, an AP initiates an authentication request.

Specifically, it may be that only the AP sends an authentication request to the authentication server through the BNG device, or the BNG device replaces the AP to send an authentication request to the authentication server; the authentication request carries the authentication information of the AP device which initiates the authentication request.

In Step S402, the authentication server authenticates the AP; if the authentication succeeds, an authentication success message is fed back to the BNG; it is to proceed to step S403; otherwise an authentication failure message is fed back to the AP, and the process ends. The authentication server authenticates based on the authentication information in the received authentication request, and the authentication process is shown in FIG. 3.

In Step S403, it is to update the AC list; the BNG device obtains the latest AC list.

The process of the BNG device obtaining the latest AC list can be: after the authentication server delivers the original AC list to the BNG device, the BNG device obtains periodically or in real time the load (or location) of each AC in the original AC list delivered by the authentication server, and arranges the ACs in the AC list according to the load (or location) of each AC, and the arrangement mode may be arranging all ACs according to their loads from light to heavy (or according to the distances of all ACs to AP from short to long); or, the network administrator configures the default original AC list on the BNG by via the command line or the NMS for the BNG device, and obtains periodically or in real time the load (or location) of each AC in the original AC list delivered by the authentication server, and arranges the ACs in the AC list in accordance with the load of each AC, and the arrangement mode can be: arranging all ACs in accordance with their loads from light to heavy (or according to their distances to the AP from short to long); or, the authentication server obtains periodically or in real time the load (or location) of each AC in the original AC list delivered by the authentication server, and arranges the ACs in the AC list according to the load (or location) of each AC, and the arrangement mode can be: sequentially arranging all ACs in accordance with their loads from light to heavy (or according to their distances to the AP from short to long), so as to form and send an updated AC list to the BNG device.

In Step S404, the BNG device delivers the latest AC list to the successfully-authenticated AP device.

In Step S405, the AP device selects an AC from the received AC list and communicates with the AC; the selection method is not repeated.

For a detailed interpretation of the concept of the present document, with combination of the practical application, the present document will be further described, it is foreseeable that the following embodiments are only a few of practical application examples of the present document, and are not intended to limit the present document. Since the modes for the AP accessing the network are various, for example, the AP can access the network via the 802.1X, PPPoE, DHCPv4/v6, static IP, VPDN, and so on, the authentication server can authenticate the AP device via the authentication modes such as the Web authentication, the EAP authentication, the BNG proxy PPP, or the DHCP user initiating a PAP or CHAP authentication, which cannot be listed out exhaustively, for the convenience of understanding and implementing the AP access control technology provided in the present document, in the following, application examples of several representative access modes will be used to describe and interpret present document in conjunction with FIG. 4.

The first application example:

the AP accesses the network by means of EAP. The AP device initiates an authentication via the EAP-MD5 (or it can be another EAP mode such as EAP-TLS, L-EAP, EAP-SIM, EAP-TTLS, P-EAP). In this embodiment, the method for controlling the APs in the WLAN provided in the present document comprises the following steps:

an AP sends an authentication start message EAPoL-Start to the BNG;

after receiving the authentication start message, the BNG feeds back an authentication protocol ID request message EAP Identity Request to the AP;

the AP sends an authentication protocol ID response message EAP Identity Response for replying to the BNG;

the BNG encapsulates the received EAP Identity Response message into an authentication access request message RADIUS Access Request message to send to the server (in this case the server is an AAA server);

the AAA server generates Challenge information, and sends the Challenge to the BNG via a RADIUS Access-Challenge message; the BNG extracts the Challenge from the RADIUS Access-Challenge message and sends it to the AP via the EAP-Request/MD5-Challenge message;

after receiving the EAP-Request/MD5-Challenge message, the AP extracts the Challenge, and performs MD5 operation with its own user password and the Challenge information, so as to obtain the encrypted user password (that is, Challenged-Pass-word), then carries the Challenged-Pass-word in the EAP-Response/MD5-Challenge message to send to the BNG; the BNG sends the challenge, the Challenged-Pass-word and the user name to the AAA server via a Radius message;

after receiving the Radius message, the AAA server extracts the authentication information (Challenge, Challenged-Pass-word and user name) to perform MD5 operation and judges whether the AP is legitimate or not; if it is legitimate, then sends an authentication success message carrying the AC list to the BNG; otherwise, sends an authentication failure message to the BNG;

after receiving the authentication success message, the BNG sends an EAP authentication success message to the AP; accordingly, after receiving the authentication failure message, the BNG sends an EAP authentication failure message to the AP, and the process ends;

the BNG sends an announcement message EAPoL-Announcement carrying the AC list to the AP;

the AP extracts the AC list from the received EAPoL-Announcement message, and selects one AC device from it to implement the management of the AP by the AC;

the AP communicates with the AC via the CAPWAP, and obtains an IP address from the BNG device to access the network via the DHCP or the PPP.

The second application example:

the AP accesses the network by means of PPP, in this embodiment, the method for controlling APs in the WLAN provided in the present document comprises the following steps:

the PPPoE and PPP-LCP negotiations are performed between the AP and the BNG to determine the PPPoE Session ID and the user authentication mode; the specific negotiation process will not be repeated herein;

the AP sends an authentication request carrying the AP authentication information to the BNG;

the BNG sends the authentication information sent by the AP to the AAA server via a Radius authentication request message;

after receiving the Radius message, the AAA server extracts the authentication information and judges whether the AP is legitimate or not, and if it is legitimate, sends an authentication success message carrying the AC list to the BNG; otherwise, sends an authentication failure message to the BNG;

after receiving the authentication success message, the BNG sends an EAP authentication success message to the AP; otherwise, after receiving the authentication failure message, the BNG sends an EAP authentication failure message to the AP, and the process ends here;

after receiving the authentication success message, the AP sends a PPP IPCP stage address request message to the BNG;

after receiving the address request message, the BNG directly assigns an IP address to the AP or assigns an IP address to the AP via the DHCP Server, and sends the assigned IP address to the user, carrying the AC list at the same time;

the AP extracts the AC list, and selects one AC device from it to communicate via the CAPWAP, so as to implement the management of AP by the AC, and uses the obtained IP address to access the network.

The third application example:

the AP accesses the network by means of DHCP (specifically the DHCPv4), and in this embodiment, the method for controlling the APs in the WLAN provided in the present document comprises the following steps:

the network administrator configures the default AC list on the BNG through the command line or the Network Management System (NMS);

the AP sends a DHCP Discover message to the BNG; the AP carries the identification information in the Discover message via the Option 60 or another expanded option, and inserts the AP geographical location information into the Discover message via the Option82 or another expanded option;

after receiving the DHCP Discover message, the BNG extracts and sends the authentication information (such as the AP's MAC information, the AP's geographical location information and/or the AP's identification information) to the AAA server via a Radius message in order to authenticate the AP;

after receiving the Radius message, the AAA server extracts the authentication information to authenticate the AP, if the authentication is successful, sends an authentication success message to the BNG, otherwise, sends an authentication failure message to the BNG, the process ends;

after receiving the authentication success message, the BNG extracts the internally configured AC list, carries it in a DHCP Offer message to send to the AP;

the AP sends a DHCP Request message to the BNG;

the BNG sends a DHCP Ack message to the AP;

the AP extracts the AC list from the received DHCP Offer, and selects one AC device from the AC list to communicate via the CAPWAP, so as to implement the management of the AP by the AC.

It is foreseeable that, in the abovementioned embodiments, the BNG can also carry the AC list in the DHCP Ack message to send to the AP; accordingly, when the AP accesses via the DHCPv6 mode, the BNG can also carry the AC list in the Advertise message or the Reply message via the Option52.

The abovementioned three embodiments do not involve the function of the authentication server or BNG device updating the AC list, which will be illustrated and explained through other two application examples in the following, it is foreseeable that the dynamic updating function can be applied to all of the abovementioned embodiments.

The fourth application example:

the AP accesses by means of PPP+DHCPv6, in this embodiment, the method for controlling the APs in the WLAN provided in the present document comprises the following steps:

each AC device periodically sends the number of its own managed APs to the BNG;

the PPPoE and PPP LCP stage negotiations are performed between the AP and the BNG to determine the PPPoE Session ID and the user authentication mode;

the AP sends an authentication request carrying the AP authentication information to the BNG;

the BNG sends the authentication information sent by the AP to the AAA server via a Radius authentication request message;

after receiving the Radius message, the AAA server extracts the authentication information and judges whether the AP is legitimate or not, if it is legitimate, sends an authentication success message carrying the AC list to the BNG; otherwise, sends the BNG an authentication failure message;

after receiving the authentication success message, the BNG extracts and saves the AC list therein, meanwhile sends a PPP authentication success message to the AP;

the AP and the BNG perform the PPP IPv6CP stage message interaction to obtain the Interface-ID;

the AP sends a DHCPv6 Request message to the BNG to apply for an IPv6 address;

the BNG adjusts the order of the ACs in the list according to the load of each AC device and the AC list information sent by AAA server, and sends a DHCPv6 Reply message to send the AP's IPv6 address to the AP, and carries the adjusted AC list information in the message via the Option52;

the AP extracts the AC list, and selects one AC device from the AC list to communicate via the CAPWAP, and accesses the network based on the IP address.

It is foreseeable that, in the abovementioned embodiments, the BNG can also carry the AC list in the PPP IPCP stage message via an extended field to send to the AP; when the AP accesses by means of PPP+ND, the BNG may also carry the AC list information in an extended option carried in the RA message of icmpv6 to send to the AP, or carries the AC list in the IPCP stage message via an extended field to send to the AP.

The fifth application example:

When the server type is a DHCP server, the method for controlling the APs in the WLAN provided in the present document comprises the following steps:

the network administrator configures the default AC list on the BNG via the command or the NMS;

each AC device periodically sends the number of its own managed APs to the BNG;

the AP and the BNG interact to complete the identity authentication, and the authentication process is not repeated here;

the BNG replaces the AP to send an address request to the DHCP Server;

the DHCP server sends the IP address assigned to the AP to the BNG, and carries the AC list;

after receiving the address assignment message fed back by the DHCP Server, the BNG extracts the AC list, and adjusts the order of the ACs in the list according to the default AC list configured on the BNG and/or the load of each AC device, and sends a DHCPv6 Reply message carrying the IP address and the adjusted AC list to the AP;

the AP extracts the AC list from the DHCPv6 Reply message, selects one AC device from the AC list to communicate via the CAPWAP, and accesses the network according to the IP address.

The above description is only for specific embodiments of the present document, and is not intended to limit the present document in any form, and any simple modifications, equivalent changes or modifications made on the above embodiments based on the technical essence of the present document still belong to the protection scope of the technique scheme of present document.

INDUSTRIAL APPLICABILITY

The abovementioned scheme has at least the following advantages:

1. Only in the case that the AP device is successfully authenticated is the AC list sent to the AP device, thus solving the problem of information leakage caused by delivering the AC list to the illegitimately-set AP device in the related art;

2. only in the case that the AP device is successfully authenticated is an IP address assigned to the AP device, thus solving the problem that an illegitimately-set AP device can access the communication network in the related art;

3. the AC list is dynamically updated, thus solving the problem in the related art that the static AC address list is inflexible and cannot achieve dynamically updating the AC list based on the load balancing;

4. the BNG replaces the AP to send an address request to the DHCP Server, thus solving the problem in the related art that the AP device cannot obtain an IP address and the AC list from the server.

What is claimed is:

1. A method for controlling an access point (AP) in a wireless local area network (WLAN), comprising:
when an AP accesses the WLAN, authenticating the AP by an authentication server being an Authentication Authorization Accounting (AAA) server or a Dynamic Host Configuration Protocol (DHCP) server, wherein the AAA server and the DCHP server are both devices;
after the authentication succeeds, delivering an access controller (AC) list by the authentication server or a broadband network gateway (BNG) to the AP; if the authentication fails, not delivering the AC list, so as to deliver the AC list to the AP only in a case that the AP is successfully authenticated, avoiding information leakage caused by delivering the AC list to an illegitimately-set AP device;
the AP selecting one AC from the AC list according to a preset rule and communicating with the selected AC.

2. The method for controlling an AP in a WLAN of claim 1, wherein, the process of authenticating the AP comprises:
judging whether access geographical location information of the AP, an account key of the AP or an authorization certificate of the AP is legitimate or not;
if legitimate, judging whether the AP meets policy requirements set by the authentication server or not;
if yes, the authentication of the AP succeeding.

3. The method for controlling an AP in a WLAN of claim 2, wherein, a process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

4. The method for controlling an AP in a WLAN of claim 1, wherein, after the authentication succeeds and before delivering the AC list to the AP, the method further comprises: updating the AC list.

5. The method for controlling an AP in a WLAN of claim 4, wherein, said updating the AC list is: a broadband network gateway (BNG) or an authentication server updating an original AC list based on the original AC list and current loads of all ACs in the original AC list, and generating an AC list which will be delivered to the AP.

6. The method for controlling an AP in a WLAN of claim 5, wherein, a process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

7. The method for controlling an AP in a WLAN of claim 4, wherein, a process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

8. The method for controlling an AP in a WLAN of claim 1, wherein, a process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

9. The method for controlling an AP in a WLAN of claim 8, wherein, a process of communicating with the selected AC is: the AP communicating with the selected AC via Control And Provisioning of Wireless Access Points Protocol (CAPWAP).

10. The method for controlling an AP in a WLAN of claim 1, wherein, a process of the AP selecting one AC from the AC list according to a preset rule and communicating with the selected AC is: the AP sequentially sending access requests to all the ACs in accordance with an order of access controllers in the AC list, selecting a successfully-accessed AC to establish a communication connection, and communicating with the selected AC.

11. A communication system, comprising at least one AP, at least one AC, a BNG and an authentication server; wherein the AP connects with the AC and the authentication server via the BNG; wherein, the authentication server is an Authentication Authorization Accounting (AAA) server or a Dynamic Host Configuration Protocol (DHCP) server, and the AAA server and the DCHP server are both devices;

the authentication server is configured to: when the AP accesses a WLAN, authenticate the AP, deliver an AC list to the AP after the authentication succeeds, or deliver the AC list to the AP by a broadband network gateway (BNG), and not to deliver the AC list if the authentication fails, so as to deliver the AC list to the AP only in a case that the AP is successfully authenticated, avoiding information leakage caused by delivering the AC list to an illegitimately-set AP device;

the AP is configured to: select one AC from the AC list according to a preset rule and communicate with the selected AC.

12. The communication system of claim 11, wherein, the BNG is further configured to: save the AC list and deliver the saved AC list to the AP after the authentication server successfully authenticates the AP.

13. The communication system of claim 12, wherein, the BNG or the authentication server is further configured to: update the AC list.

* * * * *